(12) United States Patent
Lee (10) Patent No.: US 8,321,886 B2
(45) Date of Patent: Nov. 27, 2012

(54) METHOD OF PROVIDING CONTROLLED-ACCESS INFORMATION AND VIDEO RECEIVING APPARATUS TO USE THE SAME

(75) Inventor: Jong-chool Lee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 798 days.

(21) Appl. No.: 11/854,724

(22) Filed: Sep. 13, 2007

(65) Prior Publication Data

US 2008/0216109 A1 Sep. 4, 2008

(30) Foreign Application Priority Data

Jan. 30, 2007 (KR) .................. 10-2007-0009685

(51) Int. Cl.
*H04N 7/16* (2011.01)
(52) U.S. Cl. ............................. 725/25; 725/31
(58) Field of Classification Search ............. 725/25
See application file for complete search history.

(56) References Cited

U.S. PATENT DOCUMENTS

| | | | | |
|---|---|---|---|---|
| 5,282,249 A * | 1/1994 | Cohen et al. | .................. | 380/229 |
| 6,690,797 B1 | 2/2004 | de Vito et al. | | |
| 7,941,184 B2 * | 5/2011 | Prendergast et al. | .......... | 455/558 |
| 2003/0197732 A1 * | 10/2003 | Gupta | .......................... | 345/764 |
| 2006/0116780 A1 * | 6/2006 | Kobayashi et al. | ............. | 700/94 |

FOREIGN PATENT DOCUMENTS

| | | |
|---|---|---|
| DE | 9217379.9 | 4/1993 |
| EP | 0607767 | 7/1994 |
| EP | 0696141 | 2/1996 |
| EP | 1638006 | 3/2006 |
| EP | 1638332 | 3/2006 |
| KR | 2004-5237 | 1/2004 |
| KR | 2006-84192 | 7/2006 |
| WO | 00/59210 | 10/2000 |

OTHER PUBLICATIONS

Extended European Search Report issued Oct. 18, 2011 in EP Application No. 07120777.3.
Giachetti J-L et al: "A Common Conditional Access Interface for Digital Video Broadcasting Decoders", IEEE Transactions on Consumer Electronics, IEEE Service Center, New York, NY, US, vol. 41, No. 3, Aug. 1, 1995 pp. 836-841, XP000539543, ISSN: 0098-3063, DOI: 10.1109/30.468076 *the whole document*.

* cited by examiner

*Primary Examiner* — Brian Pendleton
*Assistant Examiner* — Olugbenga Idowu
(74) *Attorney, Agent, or Firm* — Stanzione & Kim, LLP (57) ABSTRACT

In a controlled access broadcast system, a method of providing controlled-access information to a user includes determining whether a selected channel is a controlled-access channel, determining whether a smart card mounted in a smart card mounting part is configured to access the selected channel, if the selected channel is determined to be a controlled-access channel, and displaying indicia that indicates the configuration of the mounted smart card with respect to access to the selected channel. Therefore, a user can mount a smart card to access the controlled-access channel, thus increasing user convenience.

46 Claims, 4 Drawing Sheets

METHOD OF PROVIDING CONTROLLED-ACCESS INFORMATION AND VIDEO RECEIVING APPARATUS TO USE THE SAME

CROSS-REFERENCE TO RELATED APPLICATIONS

This application claims priority under 35 U.S.C. §119(a) from Korean Patent Application No. 2007-9685 filed Jan. 30, 2007, in the Korean Intellectual Property Office, the disclosure of which is incorporated herein by reference in its entirety.

BACKGROUND OF THE INVENTION

1. Field of the Invention

The present general inventive concept relates to controlled-access video reception. More particularly, the present general inventive concept relates to a method of providing controlled-access information and a video receiving apparatus to use the same, in which the controlled-access information is displayed when selecting a controlled-access channel.

2. Description of the Related Art

Video receiving apparatuses receive broadcast signals supplied from broadcast providers via antennas and display video corresponding to the received broadcast signals. Video receiving apparatuses are typically used with set-top boxes and TVs.

Broadcast providers have introduced a subscription model to existing television (TV) terrestrial broadcast services, which have historically depended primarily on advertising revenue, limiting program access to only subscribers who pay a service fee corresponding to controlled-access broadcast signals. Accordingly, video receiving apparatuses include systems that perform conditional access services to display video corresponding to controlled-access broadcast signals.

A Conditional Access System (CAS) provides the conditional limited reception so that only an authorized subscriber can descramble a received signal to view a program scrambled and transmitted by a broadcast provider.

Recently, smart cards with unique personal information regarding subscribers have been incorporated in video receiving apparatuses including CASs, taking into consideration taxation, convenience, stability or the like, and thus video corresponding to controlled-access broadcast signals have become widespread using password keys provided by smart cards.

In conventional video receiving apparatuses, if a user selects a controlled-access channel, a coded broadcast signal may be decoded and video corresponding to the broadcast signal may be displayed only when viewing access to the selected channel is granted to a user with a smart card. On the other hand, when viewing access to the selected channel is not granted to a user with a mounted smart card, a terse message indicating this situation may be displayed. For example, abnormal video and/or a message stating that "Viewing is impossible" may be displayed.

Accordingly, when it is impossible to view video, a user is unable to know the reason why, and it is thus difficult to know what measures to take in order to view the video, thus causing user inconvenience.

When various broadcast providers provide broadcast signals using two or more CASs, a video receiving apparatus has to include two or more CASs to display video corresponding to each of the controlled-access broadcast signals.

In this situation, if the number of slots capable of mounting smart cards is less than the number of CASs, a smart card for the desired channel cannot be mounted. Accordingly, there is a need to mount a smart card suitable to access more than one controlled-access channel provided by more than one broadcaster.

SUMMARY OF THE INVENTION

The present general inventive concept provides a method of providing controlled-access information, a video receiving apparatus to use the same, and a user interface thereof in which a user can clearly know what the controlled-access information contains.

The present general inventive concept also provides a method of providing controlled-access information, a video receiving apparatus to use the same, and a user interface thereof, which enables a user to mount a smart card suitable to access a controlled-access channel.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of providing access information in a controlled-access broadcast system, including determining whether a selected channel is a controlled-access channel, determining whether a smart card mounted to access the selected channel is configured to grant the access, if the selected channel is determined to be a controlled-access channel, and displaying indicia representative of smart card information of the mounted smart card and of corresponding channel information of the selected channel to indicate a result of the determination of whether the smart card is configured to grant the access.

The determining of whether the smart card is configured to grant the access may include collecting first controlled-access information from the channel information of the selected channel, collecting second controlled-access information from the smart card information of the mounted smart card, and comparing the first controlled-access information with the second controlled-access information to determine whether the smart card is configured to grant the access to the controlled-access channel.

The determining of whether the smart card is configured to grant the access may include determining that the smart card is configured to grant the access if the collected first controlled-access information matches the collected second controlled-access information.

The displaying may include displaying the indicia of the channel information and the smart card information using the same color, if it is determined that the smart card is configured to access the selected channel.

The displaying may include displaying the indicia of the channel information and the smart card information using a different color, if it is determined that the smart card is not configured to access the selected channel.

The displaying may include displaying the indicia to indicate that either the channel information or the smart card information is not collected.

The channel information may include provider information on the selected channel and information on a controlled-access system being adopted by the selected channel, and the smart card information may include provider information on the mounted smart card and information on a controlled-access system being supported by the mounted smart card.

The channel information may be collected using a data signal contained in a broadcast signal received through the selected channel.

The provider information on the mounted smart card may be collected from history bytes read from the mounted smart card.

The foregoing and/or other aspects and utilities of the present general inventive concept may also be achieved by providing a video receiving apparatus including an on-screen display (OSD) generator to generate indicia indicative of access to a controlled-access channel provided by a mounted smart card, and a controller to determine whether the mounted smart card is configured to access a selected channel, if the selected channel is determined to be the controlled-access channel, and to control the OSD generator to generated the indicia.

The controller may collect channel information regarding the selected channel and smart card information regarding the mounted smart card, and may compare the collected channel information with the collected smart card information to determine whether the mounted smart card grants access to the selected channel.

The controller may determine that the mounted smart card grants access to the selected channel if the collected channel information corresponds to the collected smart card information.

The OSD generator may generate the indicia of the channel information and the smart card information using the same color, if the controller determines that the mounted smart card grants access to the selected channel.

The OSD generator may generate the indicia of the channel information and the smart card information using a different color, if the controller determines that the mounted smart card does not grant access to the selected channel.

The OSD generator may generate indicia indicating unidentified information, if either the channel information or the smart card information is not collected.

The channel information may include provider information on the selected channel and information on a controlled-access system being adopted by the selected channel, and the smart card information may include provider information on the mounted smart card and information on a controlled-access system being supported by the mounted smart card.

The channel information may be collected using a data signal contained in a broadcast signal received through the selected channel.

The provider information on the mounted smart card may be collected from history bytes read from the mounted smart card.

The foregoing and/or other aspects and utilities of the present general inventive concept are also achieved by providing a method of displaying access information of a controlled access system including receiving a signal corresponding to a broadcast channel, obtaining from the signal channel information pertaining to the controlled access system, reading access information from a data bearing device to determine access permission to the controlled access system, and displaying indicia representative of the channel information and the access information.

The foregoing and/or other aspects and utilities of the present general inventive concept are also achieved by providing a video receiving apparatus comprising a signal processor to extract controlled-access information from a selected broadcast video channel, a data reader to extract controlled-access information from a data bearing device, a controller to compare the controlled-access information from the selected broadcast video channel with the controlled-access information from the data bearing device to determine access permission to content of the broadcast video channel, an on-screen display generator to generate indicia representative of the controlled-access information from the selected broadcast video channel and of the controlled-access information from the data bearing device that indicate the access permission of a holder of the data bearing device to the content of the broadcast video channel, and a display to display the indicia.

The foregoing and/or other aspects and utilities of the present general inventive concept are also achieved by providing a video receiving apparatus comprising a data reader to extract controlled-access information from a data bearing device, a storage part containing a database of data bearing devices allowed to access respective broadcast video channels, a controller to compare the controlled-access information from the data bearing device with the database to determine access permission to content of a selected broadcast video channel, an on-screen display generator to generate indicia representative of the controlled-access information from the database and of the controlled-access information from the data bearing device that indicate the access permission of a holder of the data bearing device to the content of the broadcast video channel, and a display to display the indicia.

The foregoing and/or other aspects and utilities of the present general inventive concept are also achieved by providing a user interface of a video receiving apparatus, comprising a key input part to select a channel of a broadcast system, a signal processor to extract channel information from the selected channel, a smart card mounting part to receive a smart card having encoded thereon access information granting access to a controlled-access channel, a controller to determine from the channel information whether the select channel is the controlled-access channel to which the access information grants access, an on screen display generator to generate indicia indicative of controlled-access information pertaining to the selected channel and the access thereto by the access information of the smart card, and a display to display the indicia.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
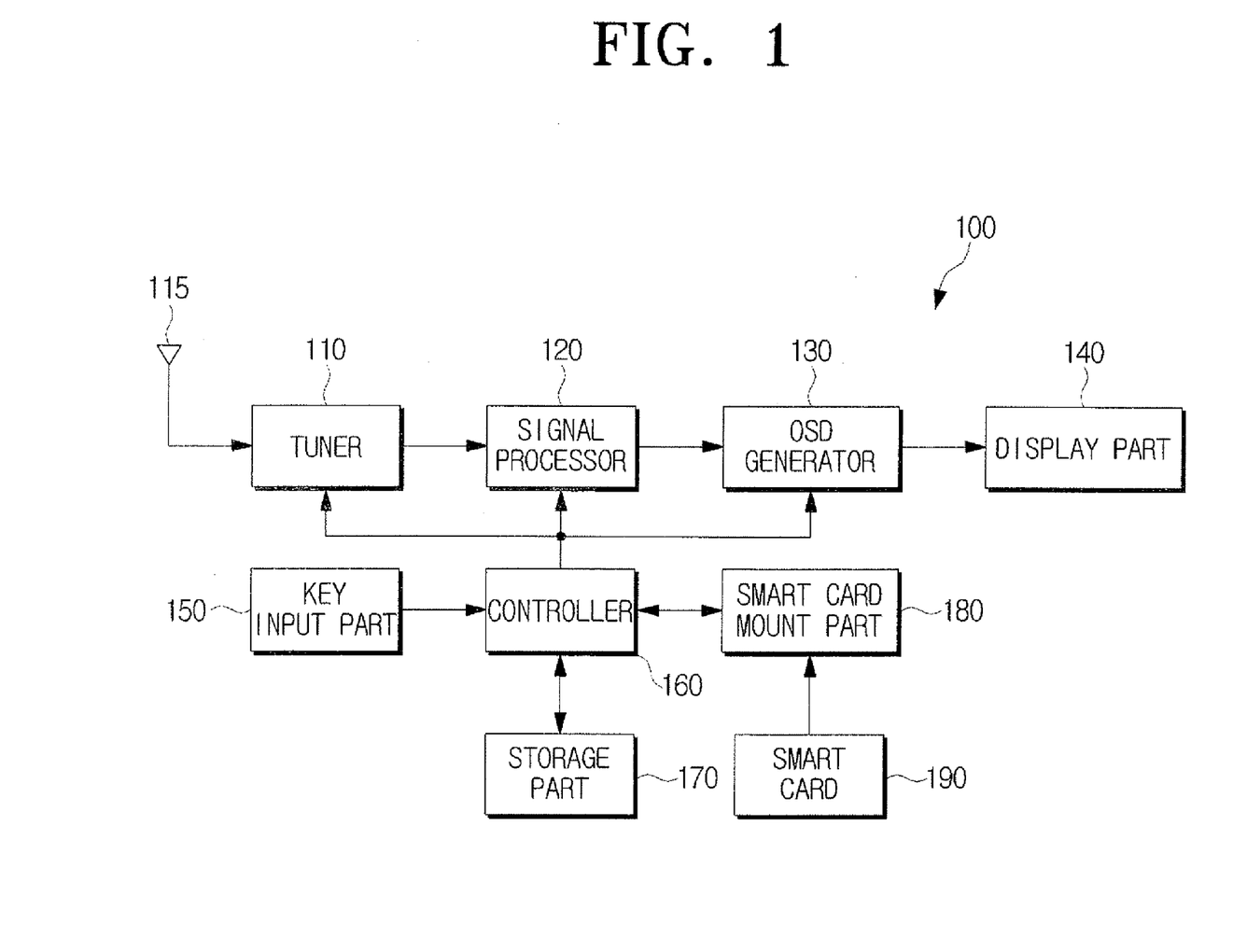
FIG. 1 is a block diagram of a video receiving apparatus according to an exemplary embodiment of the present general inventive concept.

FIG. 1 is a block diagram of a video receiving apparatus 100 according to an exemplary embodiment of the present general inventive concept.

If a controlled-access channel is selected, the video receiving apparatus 100 can determine whether a smart card 190 mounted in the video receiving apparatus 100 is a smart card granting viewing access to the selected channel. If the smart card 190 is not configured to access the channel, information pertaining to a smart card that is suitable to access the selected channel can be displayed.

It is to be understood that, as used herein, a "smart card" refers to a data bearing device that associates a user with other information, such as an account number, a password or other access control information, information regarding the controlled-access channels to which the user is granted access, and other application-specific information that allows, or disallows, the user's viewing of controlled-access channels. The smart card may be a plastic card into which an integrated circuit is embedded and that can be read by a smart card mounting device, such as smart card mount part 180 illustrated in FIG. 1 and described below. However, it is to be understood that a smart card meeting the description above may be realized through numerous alternative embodiments without departing from the spirit and intended scope of the present general inventive concept.

Referring to FIG. 1, the exemplary video receiving apparatus 100 includes a tuner 110, a signal processor 120, an on-screen display (OSD) generator 130, a display part 140, a key input part 150, a controller 160, a storage part 170, and a smart card mount part 180 into which a smart card 190 may be mounted.

The tuner 110 can receive via an antenna 115 a broadcast signal of a channel selected by a user. The signal processor 120 can decode the broadcast signal received by the tuner 110 and can process the signal so that the signal can be displayed. If the broadcast signal is a broadcast signal of a controlled-access channel, the signal processor 120 can decode the broadcast signal using, for example, a password key provided by the smart card 190.

The OSD generator 130 can generate information regarding whether the mounted smart card 190 is configured to access the selected channel, i.e., the smart card 190 contains user data and account data that specifies to a CAS in the video receiving apparatus 100 that the user is granted access to the selected channel. The OSD generator 130 may use combinations of indicia, such as characters and symbols, to convey the information to a user. Additionally, if the mounted smart card 190 is not configured to access the selected channel, the OSD generator 130 can generate information pertaining to the smart card 190 and to the selected channel so that it can be ascertained why access to the selected channel has been denied. The generated information is then provided to, and displayed on, the display part 140.

The display part 140 can display the information regarding whether the mounted smart card 190 is configured to access the selected channel, together with information as to how the smart card 190 must be configured to access the selected channel when the smart card 190 is not so configured. If the mounted smart card 190 is configured to access the selected channel, viewable, or "normal," video can be displayed on the display part 140, and if not, normal video is not displayed on the display part 140.

The key input part 150 may include keys to select channels. The key input part 150 can transmit a signal corresponding to a channel selected by a channel selection key to the controller 160.

The controller 160 can control the tuner 110 to receive the broadcast signal of the channel selected by the key input part 150. If the selected channel is a controlled-access channel, the controller 160 can determine whether the mounted smart card 190 is configured to access the selected channel by a comparison of information on the controlled-access channel and on the smart card 190. The controller 160 may alternatively evaluate the information encoded on the smart card 190 against data pertaining to smart cards configured to access each controlled-access channel stored in the storage part 170.

Additionally, the controller 160 can control the OSD generator 130 to generate indicia indicating whether the smart card 190 grants access to the selected channel according to the result of determining. If the smart card does not grant access the selected channel, the controller 160 can control the OSD generator 130 to generate information pertaining to a smart card that is suitable to access the selected channel.

The storage part 170 can store a database of access permission information pertaining to smart cards that are configured to access corresponding controlled-access channels.

The smart card mount part 180 may include at least one slot through which the smart card 190 may be mounted.

Figure 2:
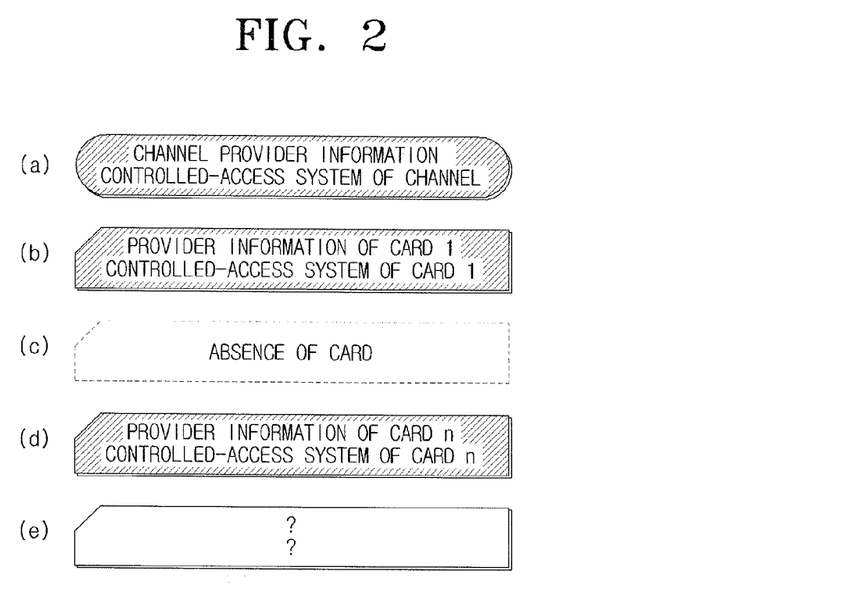
FIG. 2 is a diagram explaining a method of providing controlled-access information in a video receiving apparatus according to an exemplary embodiment of the present general inventive concept.

FIG. 2 is a diagram explaining a method of providing controlled-access information in a video receiving apparatus according to an exemplary embodiment of the present general inventive concept.

FIG. 2 illustrates exemplary indicia generated by the OSD generator 130 indicating whether the mounted smart card 190 is configured to access the selected channel. The exemplary indicia include (a) currently selected channel information, (b) smart card information when access is granted, (c) indication of the absence of a card, (d) smart card information when access is denied, and (e) unidentified information.

The exemplary currently selected channel information indicia illustrated at FIG. 2(*a*) indicates information on the currently selected channel, and may include provider information and controlled-access system information regarding the channel. The provider information regarding the channel refers to information pertaining to a broadcast provider which transmits the currently selected channel, and the controlled-access system information regarding the channel relates to a controlled-access system adopted by the currently selected channel.

The exemplary indicia of smart card information illustrated at FIG. 2(*b*) indicates that the mounted smart card 190 is configured to access the selected channel, and includes, for example, provider information and controlled-access system information regarding the exemplary smart card 1. The provider information pertaining to the card relates to information on a company which issues the smart card, and the controlled-access system information pertaining to the card relates to a controlled-access system being supported by the smart card 190.

If the smart card 190 is configured to access the selected channel, the OSD generator 130 may generate indicia that indicate such access in an easily recognizable manner, such as generating the currently selected channel information illustrated in FIG. 2(*a*) and the smart card information illustrated in FIG. 2(*b*) using the same color.

The exemplary indicia illustrated at FIG. 2(*c*) indicate that no smart card is mounted. For example, an outline of a smart card symbol may be displayed in a dotted line with text informing the user that no card is mounted, such as "Absence of Card."

The exemplary smart card information illustrated at FIG. 2(*d*) indicates that the mounted smart card does not grant access to the selected channel, and includes, for example, provider information and controlled-access system information regarding the mounted smart card n.

If the smart card 190 is not configured to access the selected channel, the OSD generator 130 may generate indicia that indicate such access is not allowed in an easily recognizable manner, such as generating the currently selected channel information illustrated at FIG. 2(*a*) and the smart card information illustrated at FIG. 2(*b*) using different colors.

The exemplary unidentified information indicia illustrated at FIG. 2(*e*) indicate that the information on the mounted smart card cannot be accessed and/or analyzed. When the provider information and controlled-access system information pertaining to the mounted smart card cannot be determined, the OSD generator 130 may generate the indicia to include a symbol "?".

The information on the smart card may be displayed in conjunction with a symbol in the form of a smart card, such as illustrated in FIG. 2 at (b)-(e).

Figure 3:
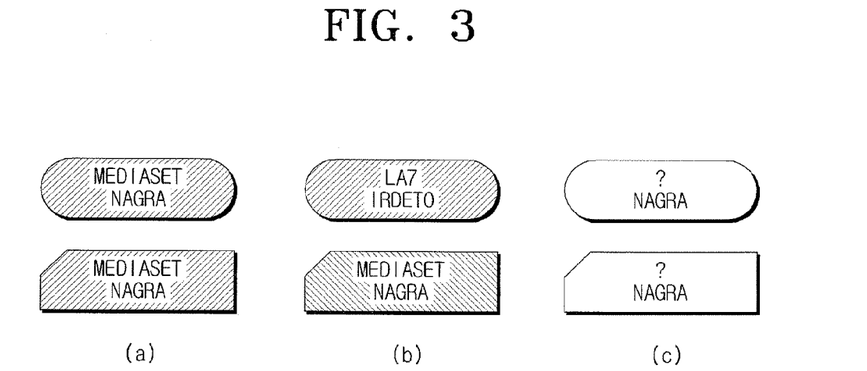
FIG. 3 is a diagram explaining in further detail a method of providing controlled-access information in a video receiving apparatus according to an exemplary embodiment of the present general inventive concept.

FIG. 3 is a diagram illustrating displayed controlled-access information in a video receiving apparatus 100 according to an exemplary embodiment of the present general inventive concept.

FIG. 3 illustrates an example of information regarding whether the smart card is suitable to access the selected channel, by combining the indicia illustrated in FIG. 2. Specifically, FIG. 3 illustrates (a) indicia indicating that the smart card is configured to access the channel, (b) indicia indicating that the smart card is not configured to access the channel, and (c) indicia indicating that the information on the smart card and in the channel signal is unidentifiable.

FIG. 3(*a*) illustrates displayed indicia that indicate the mounted smart card is configured to access the selected channel, and current channel information and smart card information illustrated in FIG. 3(*a*) can be displayed using the same color.

Referring to FIG. 3(*a*), the currently selected channel illustrated is provided by broadcast provider "MEDIASET", and controlled-access system "NAGRA" is currently adopted. Additionally, according to the smart card information, the smart card is provided by card provider "MEDIASET", and controlled-access system "NAGRA" is currently supported. Thus, the smart card is configured to access the selected channel, since the current channel information corresponds to the smart card information.

FIG. 3(*b*) illustrates displayed indicia where the mounted smart card is not configured to access the selected channel, and the current channel information and the smart card information illustrated in FIG. 3(*b*) may be displayed using different colors.

Referring to FIG. 3(*b*), the currently selected channel is provided by broadcast provider "LA7", and controlled-access system "IRDETO" is currently adopted. Additionally, according to the smart card information, the smart card is provided by card provider "MEDIASET", and controlled-access system "NAGRA" is currently supported. Thus, the smart card is not configured to access the selected channel, since the current channel information differs from the smart card information.

Accordingly, if the mounted smart card 190 is not configured to access the selected channel, such will be recognized by the user, and a smart card corresponding to the current channel can be mounted. This is easily recognized by a user using the indicia of the current channel information indicate the smart card information of a smart card that is configured to access the selected channel.

FIG. 3(*c*) illustrates displayed indicia where the system is unable to analyze at least one of the current channel information and smart card information.

Figure 4:
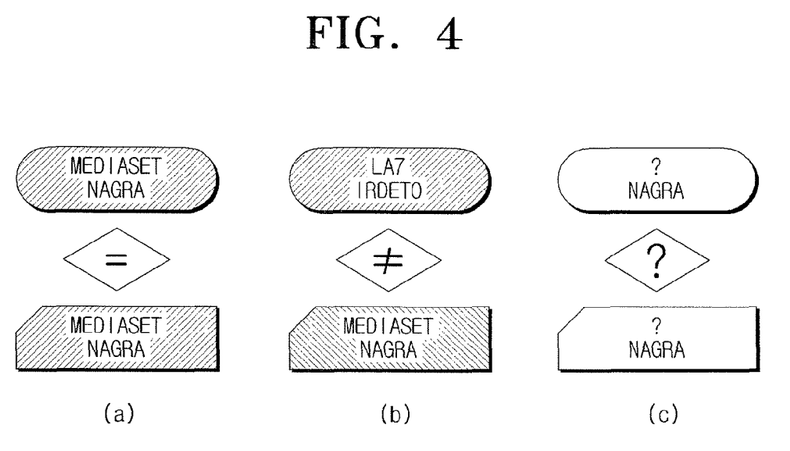
FIG. 4 is a diagram explaining in further detail a method of providing controlled-access information in a video receiving apparatus according to another exemplary embodiment of the present general inventive concept.

FIG. 4 is a diagram illustrating displayed controlled-access information in a video receiving apparatus according to another exemplary embodiment of the present general inventive concept.

FIG. 4 illustrates another example of information regarding whether the smart card is configured to access the selected channel, by combining the indicia of FIG. 2. Specifically, FIG. 4 illustrates (a) smart card and channel information when access is granted, (b) smart card and channel information when access is denied, and (c) indicia indicating that the information on the smart card and channel signal are unidentifiable.

The indicia illustrated in FIG. 4(*a*)-(*c*) can be displayed in the same manner as in FIG. 3, and the relation between the current channel information and smart card information can be further distinguished by additional indicia according to each situation.

As illustrated in FIGS. 3 and 4, the information regarding whether the smart card is configured to access the channel can be displayed using characters and symbols, but this is merely exemplary. Alternatively, the information regarding whether the smart card is configured to access the channel can be displayed using a message.

For example, the information regarding whether the smart card is configured to access the channel can be displayed along with a text message, such as "This smart card is not configured to access (channel information). Please mount (type of smart card)."

Figure 5:
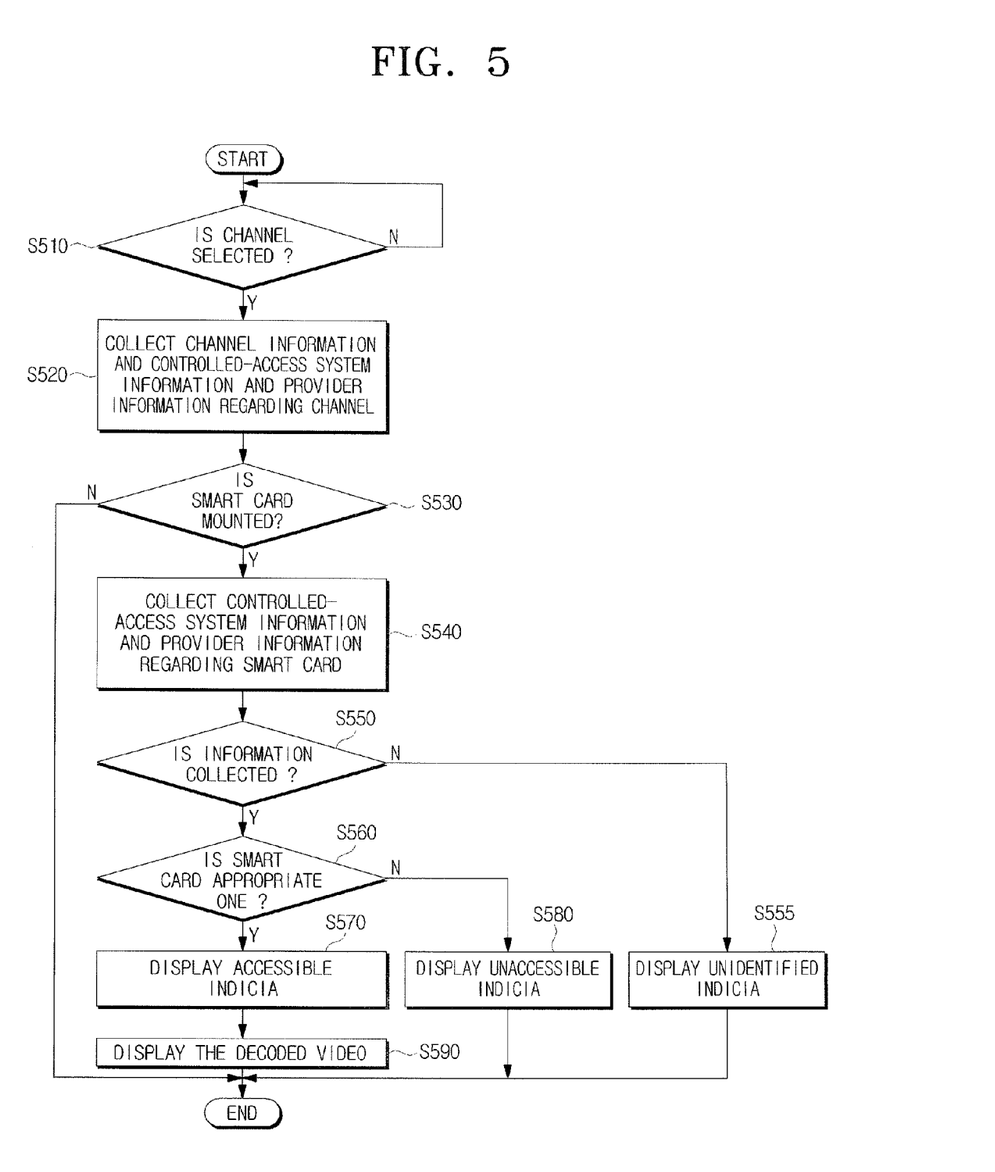
FIG. 5 is a flowchart regarding a method of providing controlled-access information in a video receiving apparatus according to an exemplary embodiment of the present general inventive concept.

FIG. 5 is a flowchart illustrating a method of providing controlled-access information in a video receiving apparatus according to an exemplary embodiment of the present general inventive concept.

In FIG. 5, the controller 160 can determine whether the controlled-access channel is selected in operation S510.

If it is determined that the controlled-access channel is selected, the controller 160 can collect channel information, controlled-access system information and channel provider information regarding the channel in operation S520.

Specifically, the controller 160 can analyze data information contained in the broadcast signal decoded by the signal processor 120, and collect information on the channel name, channel provider's name or channel provider's unique number and controlled-access system information regarding the channel.

The above information can be collected using a Service Description Table (SDT) contained in the data information. The channel provider information can be obtained from the Transport Stream (TS) identification (ID), Network ID, original Network ID, and local channel number.

The controller 160 can determine whether the smart card 190 is mounted in the smart card mount part 180 in operation S530. If a smart card detect signal is output from the smart card mount part 180, the controller 160 can determine that the smart card 190 is mounted. If it is determined that the smart card 190 is not mounted, the controller 160 can control the OSD generator 130 to generate the indicia corresponding to the absence of a card.

If it is determined that the smart card 190 is mounted, the controller 160 can collect the controlled-access system information and provider information regarding the mounted smart card in operation S540.

Specifically, the controller 160 can collect the provider information regarding to the mounted smart card from history bytes read from the smart card 190, or from the provider information using the controlled-access system information stored on the smart card 190.

The controller 160 can determine whether all information is collected in operation S550, which includes channel information on the currently selected channel and smart card information on the mounted smart card 190.

If it is determined that not all information is collected, the controller 160 can control the OSD generator 130 to generate the indicia indicating unidentified information in operation S555.

If it is determined that all information is collected, the controller 160 can determine whether the mounted smart card 190 grants access to the selected channel in operation S560. Specifically, the controller 160 can compare the channel information to the smart card information, and thus the controller 160 can determine whether the smart card 190 is one that matches the channel information. Alternatively, the controller 160 can determine whether the smart card 190 grants access to the selected channel if the information on the smart card 190 is stored in the database of information pertaining to smart cards configured to access each corresponding controlled-access channel. Here, the database on smart cards may have been previously stored in the storage part 170.

If it is determined that the mounted smart card 190 grants access to the selected channel, the controller 160 can control the OSD generator 130 to generate the indicia that the smart card corresponds to the channel information in operation S570.

On the other hand, if it is determined that the mounted smart card 190 does not grant access to the selected channel, the controller 160 can control the OSD generator 130 to generate the indicia indicating that the smart card information differs from the channel information in operation S580.

Additionally, in response to access being granted, the controller 160 can control the signal processor 120 to display the smart card information of the accessible channel, along with the video decoded using the password key provided by the mounted smart card in operation S590.

Accordingly, by displaying information regarding whether the smart card mounted in the smart card slot is configured to access the selected channel, through indicia indicating what kind of smart card the currently selected channel requires, access information corresponding to the channel can be clearly recognized by a user.

As described above, according to the exemplary embodiments of the present general inventive concept, the information regarding whether the mounted smart card is configured to access the selected channel can be displayed, and thus a user can mount the smart card configured to access the controlled-access channel, thus improving user convenience.

Additionally, indicia indicating what kind of smart card the currently selected channel requires can be clearly displayed, and it is therefore possible to identify and correct problems arising from an incorrect smart card being mounted.

Particularly, when the number of slots in which a smart card may be mounted is less than the number of controlled-access systems, a video receiving apparatus configured to receive signals from several controlled-access systems can allow interchanging cards to access the controlled-access channel using the displayed information, thus reducing user confusion.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of providing access information in a controlled-access broadcast system, comprising:
   determining whether a selected channel is a controlled-access channel;
   determining whether a smart card mounted to access the selected channel is configured to grant the access, if the selected channel is determined to be the controlled-access channel;
   displaying smart card information and channel information of the selected channel to indicate a result of the determination of whether the mounted smart card is suitable for accessing the selected channel; and
   determining information on a separate smart card suitable for accessing the selected channel, if it is determined that the mounted smart card is not configured to grant the access,
   wherein the channel information comprises the information on the separate smart card suitable to access the selected channel, if it is determined that the mounted smart card is not configured to grant the access.

2. The method as claimed in claim 1, wherein the determining whether the mounted smart card is configured to grant the access comprises:
   collecting first controlled-access information from the channel information of the selected channel;
   collecting second controlled-access information from the smart card information of the mounted smart card; and
   comparing the first controlled-access information with the second controlled-access information to determine whether the mounted smart card is configured to grant the access to the controlled-access channel.

3. The method as claimed in claim 2, wherein the determining whether the mounted smart card is configured to grant the access comprises:
   determining that the mounted smart card is configured to access the controlled-access channel if the collected first controlled-access information matches the second controlled-access information.

4. The method as claimed in claim 2, wherein the displaying comprises:
   displaying indicia of the channel information and the smart card information using the same color, if it is determined that the mounted smart card is configured to access the selected channel.

5. The method as claimed in claim 2, wherein the displaying comprises:
   displaying indicia of the channel information and the smart card information using a different color, if it is determined that the mounted smart card is not configured to access the selected channel.

6. The method as claimed in claim 2, wherein the displaying comprises:

displaying indicia to indicate that either the channel information or the smart card information is not collected.

7. The method as claimed in claim 2, wherein the channel information includes provider information on the selected channel and information on a controlled-access system being adopted by the selected channel, and the smart card information includes provider information on the mounted smart card and information on a controlled-access system being supported by the mounted smart card.

8. The method as claimed in claim 7, wherein the channel information is collected using a data signal contained in a broadcast signal received through the selected channel.

9. The method as claimed in claim 7, wherein the provider information on the mounted smart card is collected from history bytes read from the mounted smart card.

10. A video receiving apparatus comprising:
an on-screen display (OSD) generator to generate indicia indicative of access to a controlled-access channel maintained on a mounted smart card; and
a controller to determine whether the mounted smart card is configured to access a selected channel, if the selected channel is determined to be the controlled-access channel, and to control the OSD generator to generate the indicia; and
displaying smart card information and channel information of the controlled-access channel to indicate a result of a determination of whether the mounted smart card is suitable for accessing the controlled-access channel,
wherein the OSD generator generates and determines information on a separate smart card suitable to access the selected channel, if it is determined that the mounted smart card is not configured to grant the access,
wherein the channel information comprises the information on the separate smart card suitable to access the selected channel, if it is determined that the mounted smart card is not configured to grant the access.

11. The apparatus as claimed in claim 10, wherein the controller collects channel information regarding the selected channel and smart card information regarding the mounted smart card, and compares the collected channel information with the collected smart card information to determine whether the mounted smart card mounted grants access to the selected channel.

12. The apparatus as claimed in claim 11, wherein the controller determines that the mounted smart card grants access to the selected channel if the collected channel information corresponds to the collected smart card information.

13. The apparatus as claimed in claim 11, wherein the OSD generator generates the indicia of the channel information and the smart card information using the same color, if the controller determines that the mounted smart card grants access to the selected channel.

14. The apparatus as claimed in claim 11, wherein the OSD generator generates the indicia of the channel information and the smart card information using a different color, if the controller determines that the mounted smart card does not grant access to the selected channel.

15. The apparatus as claimed in claim 11, wherein the OSD generator generates the indicia to indicate unidentified information, if either the channel information or the smart card information is not collected.

16. The apparatus as claimed in claim 11, wherein the channel information includes provider information on the selected channel and information on a controlled-access system being adopted by the selected channel, and the smart card information includes provider information on the mounted smart card and information on a controlled-access system being supported by the mounted smart card.

17. The apparatus as claimed in claim 16, wherein the channel information is collected using a data signal contained in a broadcast signal received through the selected channel.

18. The apparatus as claimed in claim 16, wherein the provider information on the mounted smart card is collected from history bytes read from the mounted smart card.

19. A method of displaying access information of a controlled access system, comprising:
receiving a signal corresponding to a broadcast channel;
obtaining from the signal channel information pertaining to the controlled access system;
reading access information from a first data bearing device to determine access permission to the controlled access system; and
displaying smart card information and channel information of a selected channel to indicate a result of a determination of whether the first data bearing device is suitable for accessing the selected channel; and
determining information about a separate second data bearing device suitable for accessing the selected channel, if it is determined that the first data bearing device is not configured to grant the access,
wherein the channel information comprises the information about a second data bearing device suitable to access the selected channel, if it is determined that the first data bearing device is not configured to grant the access.

20. The method as claimed in claim 19, further comprising:
displaying indicia to indicate whether access is granted to the controlled access system.

21. The method as claimed in claim 20, wherein the displaying of the indicia comprises:
displaying a symbol representative of the first data bearing device with the access information and a symbol of the broadcast channel with the channel information in a like color if the first data bearing device is configured to grant access to the controlled access system.

22. The method as claimed in claim 20, wherein the displaying of the indicia comprises:
displaying a symbol representative of the first data bearing device with the access information and a symbol of the broadcast channel with the channel information in different colors if the first data bearing device is not configured to grant access to the controlled access system.

23. The method as claimed in claim 20, wherein the displaying of the indicia comprises:
displaying other indicia indicative of the access permission to the controlled access system.

24. The method as claimed in claim 23, wherein the displaying of the other indicia comprises:
displaying a symbol representative of the first data bearing device with the access information, a symbol representative of the broadcast channel with the channel information, and a symbol indicating a result of a comparison of the access information and the channel information.

25. The method as claimed in claim 24, wherein the displaying of the symbol indicating the result of the comparison comprises:
displaying an equal sign if the access information is equal to the channel information.

26. The method as claimed in claim 24, wherein the displaying of the symbol indicating the result of the comparison comprises:
displaying an inequality sign if the access information differs from the channel information.

27. The method as claimed in claim 26, wherein the displaying of the inequality sign comprises:
displaying a not-equal sign as the inequality sign.

28. The method as claimed in claim 24, wherein the displaying of the symbol indicating the result of the comparison comprises:
displaying the symbol indicating the result of the comparison between the symbol representative of the first data bearing device and the symbol representative of the broadcast channel.

29. A video receiving apparatus comprising:
a signal processor to extract controlled-access information from a selected broadcast video channel;
a data reader to extract controlled-access information from a data bearing device connected to the data reader;
a controller to compare the controlled-access information from the selected broadcast video channel with the controlled-access information from the connected data bearing device to determine access permission to content of the broadcast video channel;
an on-screen display generator to generate and determine information on the connected data bearing device suitable to access the selected broadcast video channel, if it is determined that the connected data bearing device is not configured to grant the access,
wherein the channel information comprises the information on a second required data bearing device suitable to access the selected broadcast video channel, if it is determined that the connected data bearing device does not have access permission to content of the broadcast video channel.

30. The apparatus as claimed in claim 29, further comprising:
displaying indicia to indicate whether access is granted to the controlled access system.

31. The apparatus as claimed in claim 30, wherein the displaying of the indicia comprises:
displaying a symbol representative of the connected data bearing device with the access information and a symbol of the broadcast channel with the channel information in a like color if the connected data bearing device is configured to grant access to the controlled access system.

32. The apparatus as claimed in claim 30, wherein the displaying of the indicia comprises:
displaying a symbol representative of the connected data bearing device with the access information and a symbol of the broadcast channel with the channel information in different colors if the connected data bearing device is not configured to grant access to the controlled access system.

33. The apparatus as claimed in claim 30, wherein the displaying of the indicia comprises:
displaying other indicia indicative of the access permission to the controlled access system.

34. The apparatus as claimed in claim 33, wherein the on-screen display generator generates indicia of a symbol representative of the connected data bearing device with the access information, a symbol representative of the broadcast channel with the channel information, and a symbol indicating a result of a comparison of the access information and the channel information.

35. The apparatus as claimed in claim 34, wherein the symbol indicating the result of the comparison includes an equal sign if the access information is equal to the channel information.

36. The apparatus as claimed in claim 34, wherein the symbol indicating the result of the comparison includes an inequality sign if the access information differs from the channel information.

37. The apparatus as claimed in claim 36, wherein the inequality sign is a not-equal sign.

38. The apparatus as claimed in claim 34, wherein the on-screen display generator generates indicia of the symbol indicating the result of the comparison includes between the symbol representative of the connected data bearing device and the symbol representative of the broadcast channel.

39. The apparatus as claimed in claim 29, wherein the on-screen display generator generates indicia that indicate that one of controlled-access information from the selected broadcast video channel and the controlled-access information from the connected data bearing device is not extracted.

40. The apparatus as claimed in claim 29 further comprising:
a tuner to select the broadcast video channel from a band of frequencies supported by a transmission medium.

41. The apparatus as claimed in claim 29 further comprising:
an antenna to couple with free space as the transmission medium.

42. A video receiving apparatus comprising:
a data reader to extract controlled-access information from a first data bearing device connected to the data reader;
a storage part containing a database of second data bearing devices allowed to access respective broadcast video channels;
a controller to compare the controlled-access information from the first data bearing device with the database to determine access permission to content of a selected broadcast video channel;
an on-screen display generator to generate and determine indicia representative of the information on the data bearing device suitable to access the selected broadcast video channel, if it is determined that the connected data bearing device is not configured to grant the access,
wherein the channel information comprises the information on a second data bearing device suitable to access the selected broadcast video channel, if it is determined that the connected data bearing device does not have access permission to content of the broadcast video channel.

43. A user interface of a video receiving apparatus, comprising:
a key input part to select a channel of a broadcast system;
a signal processor to extract channel information from the selected channel;
a smart card mounting part to receive a smart card having encoded thereon access information granting access to a controlled-access channel;
a controller to determine from the channel information whether the select channel is the controlled-access channel to which the access information grants access;
an on screen display generator to generate and determine information about the received smart card suitable to access the selected channel, if it is determined that the received smart card is not configured to grant access,
wherein the channel information comprises the information about a required separate smart card suitable to access the selected channel, when with is determined that the received smart card lacks access to the controlled-access channel.

44. The user interface as claimed in claim 43, wherein the on screen display generator generates indicia that indicate at least one discrepancy between the access information of the received smart card and the channel information.

45. The method as claimed in claim 1, further comprising:
   determining whether a smart card is mounted in a smart card mount part;
   displaying indicia corresponding to an absence of the smart card if the smart card is determined not to be mounted in the smart card mount part.

46. The apparatus as claimed in claim 10, wherein the controller determines whether a smart card is mounted in a smart card mount part and controls the OSD generator to generate indicia corresponding to an absence of the smart card if the smart card is determined not to be mounted in the smart card mount part.

* * * * *